(12) United States Patent
Del Monte

(10) Patent No.: US 7,411,386 B2
(45) Date of Patent: Aug. 12, 2008

(54) METHOD FOR MEASURING THE LENGTH VARIATION OF A SPRING, AND SPRING WITH ASSOCIATED SENSOR

(75) Inventor: Mauro Del Monte, Modena (IT)

(73) Assignee: M.D. Micro Detectors S.p.A., Modena (IT)

( * ) Notice: Subject to any disclaimer, the term of this patent is extended or adjusted under 35 U.S.C. 154(b) by 0 days.

(21) Appl. No.: 11/480,409

(22) Filed: Jul. 5, 2006

(65) Prior Publication Data

US 2008/0007254 A1    Jan. 10, 2008

(51) Int. Cl.
*G01B 7/14* (2006.01)

(52) U.S. Cl. .............................. 324/207.24; 324/207.2; 324/207.21; 324/207.22

(58) Field of Classification Search ............... 324/207.2, 324/207.21, 207.24, 207.22
See application file for complete search history.

(56) References Cited

U.S. PATENT DOCUMENTS 3,848,216 A * 11/1974 Gamble .................... 338/32 H
4,356,979 A * 11/1982 Dobler ......................... 239/73
4,366,706 A *  1/1983 Wolff ........................ 73/119 A
6,469,500 B1 * 10/2002 Schmitz et al. ......... 324/207.16
2004/0092349 A1   5/2004 Iwamoto et al.

FOREIGN PATENT DOCUMENTS

JP          11-108605    *  4/1999
JP          200525745    *  3/2004

OTHER PUBLICATIONS

Patent Abstracts of Japan vol. 9, No. 199 (P-380), Aug. 16, 1985 -& JP 60 063444 A (Sharp KK), Apr. 11, 1985.

* cited by examiner

*Primary Examiner*—Jay M Patidar
(74) *Attorney, Agent, or Firm*—Modiano & Associati; Albert Josif; Daniel J. O'Byrne

(57) ABSTRACT

A method for measuring a length variation of a spring, comprising the steps of associating a measurement device with a spring, determining a measurement of the intensity of a magnetic field of the measurement device, and, on the basis of the measurement of the intensity of the magnetic field, determining the length variation of the spring.

18 Claims, 1 Drawing Sheet

METHOD FOR MEASURING THE LENGTH VARIATION OF A SPRING, AND SPRING WITH ASSOCIATED SENSOR

The present invention relates to a method for measuring the length variation of a spring and to a spring with associated sensor.

More particularly, the invention relates to a method for measuring the elongation of the spring, such measurement being usable to monitor the vibrations of an object connected to said spring, to measure forces indirectly, or to calculate a position.

The invention also relates to a spring with the associated sensor which allows to perform the elongation measurement described above.

BACKGROUND OF THE INVENTION

As it is known, there is a movement sensor of the inductive type which uses the LVDT principles, which consist of a primary coil and two secondary coils with a common movable magnetic core.

Sensors of the LVDT type are composed substantially of a fixed part and a movable part, both of which must be anchored to the two ends of the spring, or in any case to two separate points thereof; the measurement of the elongation is determined indirectly by the measurement of the relative position of the two parts of the sensor.

With a similar technique it is also possible to provide capacitive sensors.

Other sensors which can be used for the purpose are load cells, which measure the load to which the spring is subjected and allow to determine, starting from such measurement, the extent of the elongation.

In order to be able to measure the force applied by the spring, the cell must be connected between a fixed point and one end of the spring, or between the two ends of the spring.

These kinds of sensor are not free from drawbacks, including the fact that although they can be applied to the measurement of the elongation of a spring, they necessarily require the use of two anchoring points, at least one of which belongs to the body of the spring.

SUMMARY OF THE INVENTION

The aim of the present invention is to provide a device for measuring the length variation of a spring which allows to determine reliably the elongation or contraction of the spring with respect to a known static situation and does not have anchoring points which are external to such spring.

Within this aim, an object of the present invention is to provide a device for measuring the length variation of a spring in which the sensor element is connected directly to the spring at one of its ends or in any case to a single point thereof.

Another object of the present invention is to provide a device for measuring the length variation of a spring when stressed which allows to provide a precise measurement of the elongation or contraction of the spring.

Another object of the present invention is to provide a device for measuring the length variation of a spring in which the sensor can be provided simultaneously with the spring or applied at a later time to the spring.

Another object of the present invention is to provide a device for measuring the length variation of a spring and an associated sensor which are highly reliable, relatively simple to provide and at competitive costs.

This aim and these other objects which will become better apparent hereinafter are achieved by the present method for measuring a length variation of a spring, which comprises the step of associating a measurement device with a spring, and further comprising the steps of:

determining a measurement of the intensity of a magnetic field of said measurement device;

on the basis of said measurement of the intensity of the magnetic field, determining the length variation of said spring.

This aim and these objects are also achieved by a spring comprising a measurement device adapted to allow to detect a length variation of the spring with respect to an inactive condition, wherein said measurement device comprises at least one magnet adapted to generate a magnetic field which passes through turns of said spring, and at least one magnetic field sensor adapted to detect the intensity of said magnetic field, said intensity depending on the variation of the length of said spring.

BRIEF DESCRIPTION OF THE DRAWINGS

Further characteristics and advantages of the present invention will become better apparent from the following detailed description of a preferred but not exclusive embodiment of a method and a spring with a sensor according to the present invention, illustrated by way of non-limiting example in the accompanying drawings, wherein.

DESCRIPTION OF THE PREFERRED EMBODIMENTS

Figure 1:
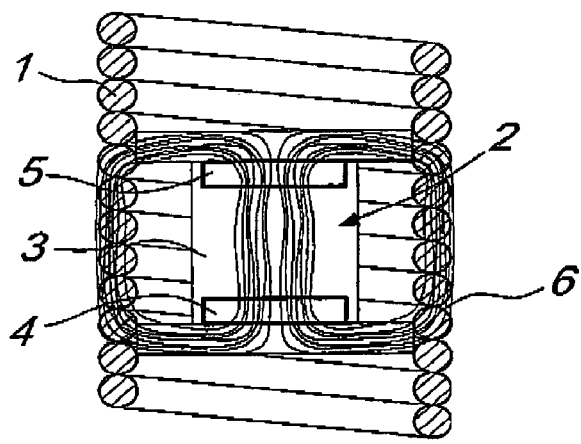
FIG. 1 is a sectional view of a spring with a measurement device according to the present invention, shown in the inactive condition.

With reference to the figures, the reference numeral 1 designates a spring, with which a measurement device, generally designated by the reference numeral 2, for detecting variations of the length of the spring 1, is associated.

The spring 1 is made of a material whose magnetic permeability is significantly different from that of vacuum. Preferably, the spring 1 is made of ferromagnetic material.

In an inactive condition of the spring 1, the turns are compact, whereas in an expanded condition of the spring 1 the turns are mutually spaced.

The measurement of the variation of the length of the spring 1 performed by the measurement device 2 described hereinafter relates to the case in which the spring 1 works by traction, accordingly considering as the initial reference status for measurements the inactive condition of the spring 1; similar considerations can be made if the spring 1 works by compression.

The measurement device 2 is arranged inside the spring 1 and comprises a supporting element 3, at least one magnet 4 and at least one magnetic field sensor 5.

In particular, although the choice of the type of material for providing the supporting element 3 is not binding, it is preferably made of ferromagnetic material.

Alternatively, the spring may be made of diamagnetic material, or paramagnetic material.

The magnet 4 can be constituted by a permanent magnet or, as an alternative, can comprise an electromagnet provided by means of a solenoid driven by way of a current source.

Figure 2:
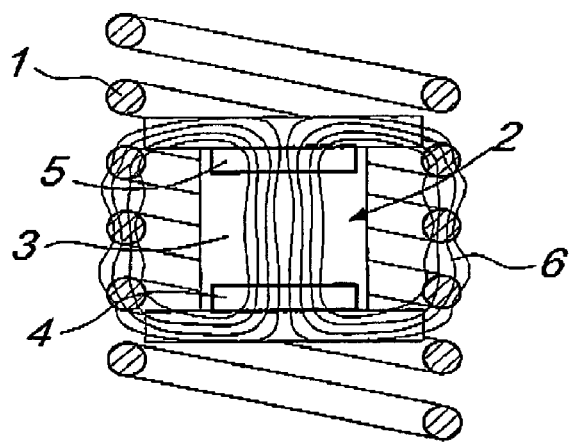
FIG. 2 is a sectional view of a spring with a measurement device according to the present invention, shown in the traction condition.

Advantageously, the magnetic field sensor 5 is constituted by a device which is crossed by a magnetic field, designated by the reference numeral 6 in FIGS. 1 and 2, and comprises an electrical characteristic which can vary depending on variations of the magnetic field 6.

In particular, the magnetic field sensor 5 is constituted by a magnetoresistive sensor or, as an alternative, by a Hall sensor.

The magnet 4 generates the magnetic field 6, which is arranged along certain lines of force.

In particular, the energy accumulated by the system through the magnetic field 6 tends naturally to the minimum, and for this reason the lines of the magnetic field 6 tend to be denser in the regions where there is material with higher permeability (i.e., the material of which the turns of the spring 1 are made), and to become more diffuse where the material is not present.

The operation of the measurement device 2 is therefore based on a direct measurement of the intensity of the magnetic field 6 which affects the turns of the spring 1.

In particular, the magnetic field 6 generated by the magnet 4 follows the path of minimum reluctance that passes through the supporting element 3, passes through the magnetic field sensor 5, and closes by passing through the turns of the spring 1.

When the spring 1 is inactive, the lines of magnetic field 6 generated by the magnet 4 that pass through the turns are closer, since the path through the material with high permeability is substantially continuous.

In this case, the magnetic circuit has the lowest reluctance, and accordingly the value of the intensity of the magnetic field 6 is highest.

Likewise, when the spring 1 is extended, the magnetic circuit comprises the air gaps between one turn and the next and therefore follows a path with higher reluctance, with a consequent decrease of the intensity of the magnetic field 6.

Figure 3:
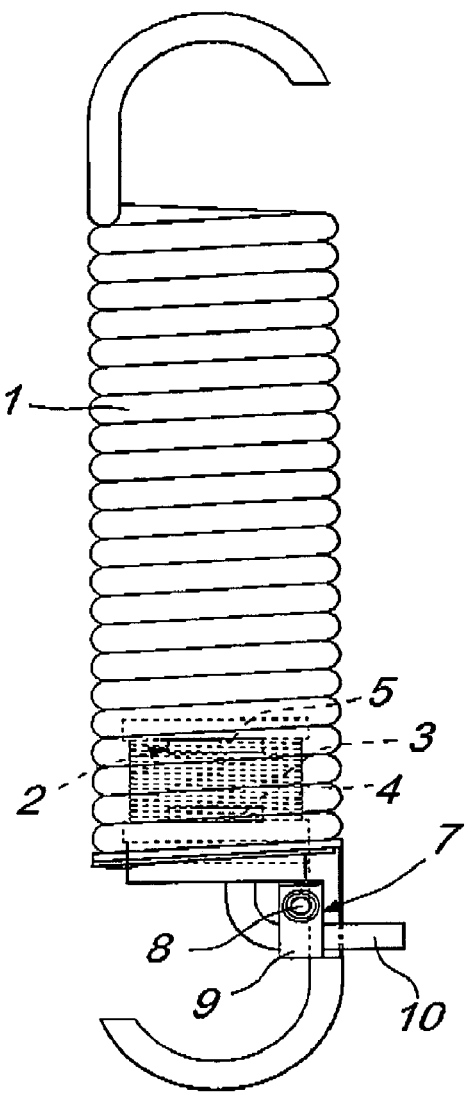
FIG. 3 is a view of the spring with a measurement device according to the invention, illustrating the means for fixing the device to the spring.

As shown in FIG. 3, the measurement device 2 is connected to the spring 1 by way of fixing means, generally designated by the reference numeral 7.

The fixing means 7 comprise a screw 8, which can be tightened in order to fix a fixing element 9, connected to the supporting element 3, to one of the turns of the spring 1.

FIG. 3 further illustrates the presence of connecting cable 10 in the case in which the magnet 4 is constituted by a solenoid which can be supplied with power externally.

The operation of the present invention is as follows.

As shown in FIG. 1, if the spring 1 is inactive, the path of the magnetic field 6 generated by the magnet 4 affects the supporting element 3 and the closely spaced turns of the spring 1.

In this case, the reluctance of the path followed by the magnetic field 6 is lowest, since such magnetic path affects almost exclusively material of the ferromagnetic type; accordingly, the intensity of the magnetic field 6 measured by the magnetic field sensor 5 is highest.

If the spring 1 is in an expanded condition, as shown in FIG. 2, the turns are mutually spaced and the magnetic field 6 passes through air gaps between one turn and the next.

The magnetic circuit thus constituted, therefore, does not comprise only ferromagnetic material, producing a higher reluctance than measured respectively in the inactive condition of the spring 1, with a consequent lower intensity of the magnetic field 6 measured by the magnetic field sensor 5.

In this manner, it is possible to trace the measurement made at different lengths of the spring 1 to variations of an output voltage or current signal of the magnetic field sensor 5.

In practice it has been found that the described method and device achieve the intended aim and objects, and in particular the fact is stressed that they allow to achieve an indirect measurement of the length variation of a spring on the basis of variations of the intensity of a magnetic field whose magnetic circuit comprises such spring.

In particular, the device allows to determine reliably the elongation or contraction of the spring with respect to a known static situation.

This entails that if the spring is applied to a machine so that it is subjected to a static load, the measurement device is capable of measuring length variations with respect to said static situation.

The method and the device thus conceived are susceptible of numerous modifications and variations, all of which are within the scope of the appended claims.

All the details may further be replaced with other technically equivalent elements.

In practice, the materials used, as well as the contingent shapes and dimensions, may be any according to requirements without thereby abandoning the scope of the protection of the appended claims.

What is claimed is:

1. A method for measuring a length variation of a spring, comprising the steps of:
   providing a measurement device that comprises; at least one magnet for generating a magnetic field; at least one magnetic field sensor; and a supporting element to which said at least one magnet and said at least one magnetic field sensor are fixed;
   connecting said measurement device with a spring such that said measurement device is fixed to said spring at a single point;
   generating, by means of said at least one magnet, a magnetic field such that said magnetic field pass through turns of said spring;
   determining the intensity of said magnetic field of said at least one magnet of said measurement device;
   on the basis of said measurement of the intensity of the magnetic field, determining the length variation of said spring.

2. The method of claim 1, wherein said magnet is constituted by a permanent magnet.

3. The method of claim 1, wherein said magnet is constituted by an electromagnet which comprises a solenoid driven by means of an external current source.

4. The method of claim 1, wherein said at least one magnetic field sensor is immersed within said magnetic field generated by said magnet, said intensity of said magnetic field depending on the length variation of said spring.

5. The method of claim 4, wherein said magnetic field sensor is a magnetoresistive sensor.

6. The method of claim 4, wherein said magnetic field sensor is a Hall sensor.

7. The method of claim 4, wherein said supporting element is made of ferromagnetic material, and said magnetic field passes through said supporting element and through said magnetic field sensor.

8. The method of claim 7, wherein the distance between said at least one magnet and said at least one magnetic field sensor both fixed to said supporting element remains constant when said spring changes in length.

9. The method of claim 1, wherein said measurement device is arranged inside said spring.

10. The method of claim 1, wherein said measurement device is arranged outside said spring.

11. A spring comprising a measurement device which is adapted to allow detection of the variation of a length of said spring with respect to an inactive condition, wherein said measurement device comprises at least one magnet, at least one magnetic field sensor, and a supporting element to which said at least one magnet and said at least one magnetic field sensor are fixed, said measurement device being fixedly connected to said spring at a single point such that said at least one magnet generates a magnetic field that passes through turns of said spring and through said magnetic field sensor that detects an intensity of said magnetic field whereby said intensity depending on the length variation of said spring.

12. The spring of claim 11, wherein said spring is made of a material whose magnetic permeability is significantly different from the magnetic permeability of vacuum.

13. The spring of claim 11, wherein said spring is made of ferromagnetic material.

14. The spring of claim 11, wherein said spring is made of diamagnetic material.

15. The spring of claim 11, wherein said spring is made of paramagnetic material.

16. The spring of claim 11, wherein said measurement device is arranged inside said spring.

17. The spring of claim 11, wherein said measurement device is arranged outside said spring.

18. The spring of claim 11, wherein said measurement device is connected to a portion of a turn of said spring.

* * * * *